US012338795B2

(12) United States Patent
Bas Quesada et al.

(10) Patent No.: US 12,338,795 B2
(45) Date of Patent: Jun. 24, 2025

(54) METHOD FOR COMMANDING AN UPSTREAM WIND TURBINE IN A WIND FARM

(71) Applicant: Siemens Gamesa Renewable Energy Innovation & Technology S.L., Sarriguren (ES)

(72) Inventors: Jesus Bas Quesada, Madrid (ES); Carlos Moral Gonzalez, Madrid (ES); Felipe Palou Larranaga, Navarra (ES); Juan Jose Pena Martinez, Gondomar (ES); Carlos Pizarro De La Fuente, Madrid (ES); Jaime Suarez Aizpun, Madrid (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/556,487

(22) PCT Filed: Apr. 7, 2022

(86) PCT No.: PCT/EP2022/059324
§ 371 (c)(1),
(2) Date: Oct. 20, 2023

(87) PCT Pub. No.: WO2022/228855
PCT Pub. Date: Nov. 3, 2022

(65) Prior Publication Data
US 2024/0191691 A1 Jun. 13, 2024

(30) Foreign Application Priority Data
Apr. 27, 2021 (EP) ..................................... 21382364

(51) Int. Cl.
F03D 7/04 (2006.01)
F03D 7/02 (2006.01)

(52) U.S. Cl.
CPC .......... F03D 7/049 (2023.08); F03D 7/0204 (2013.01); F03D 7/0292 (2013.01);
(Continued)

(58) Field of Classification Search
None
See application file for complete search history.

(56) References Cited

U.S. PATENT DOCUMENTS 9,617,975 B2 * 4/2017 Attia ..................... F03D 17/00
2014/0037447 A1 * 2/2014 Attia ..................... F03D 7/0204
416/9

FOREIGN PATENT DOCUMENTS

| CN | 112459965 A | 3/2021 |
| EP | 2696067 A2 | 2/2014 |
| EP | 3536948 A | 9/2019 |

OTHER PUBLICATIONS

PCT International Search Report and Written Opinion of International Searching Authority mailed Jul. 15, 2022 corresponding to PCT International Application No. PCT/EP2022/059324 filed Apr. 7, 2022.

\* cited by examiner

*Primary Examiner* — Juan G Flores
(74) *Attorney, Agent, or Firm* — Schmeiser, Olsen & Watts LLP

(57) ABSTRACT

A method for commanding an upstream wind turbine in a wind farm having a plurality of spatially distributed wind turbines and a method for controlling the upstream wind turbine in the wind farm.

14 Claims, 6 Drawing Sheets

(52) U.S. Cl.
CPC ... *F05B 2260/84* (2013.01); *F05B 2270/1033* (2013.01); *F05B 2270/204* (2020.08); *F05B 2270/321* (2013.01); *F05B 2270/331* (2013.01); *F05B 2270/332* (2013.01)

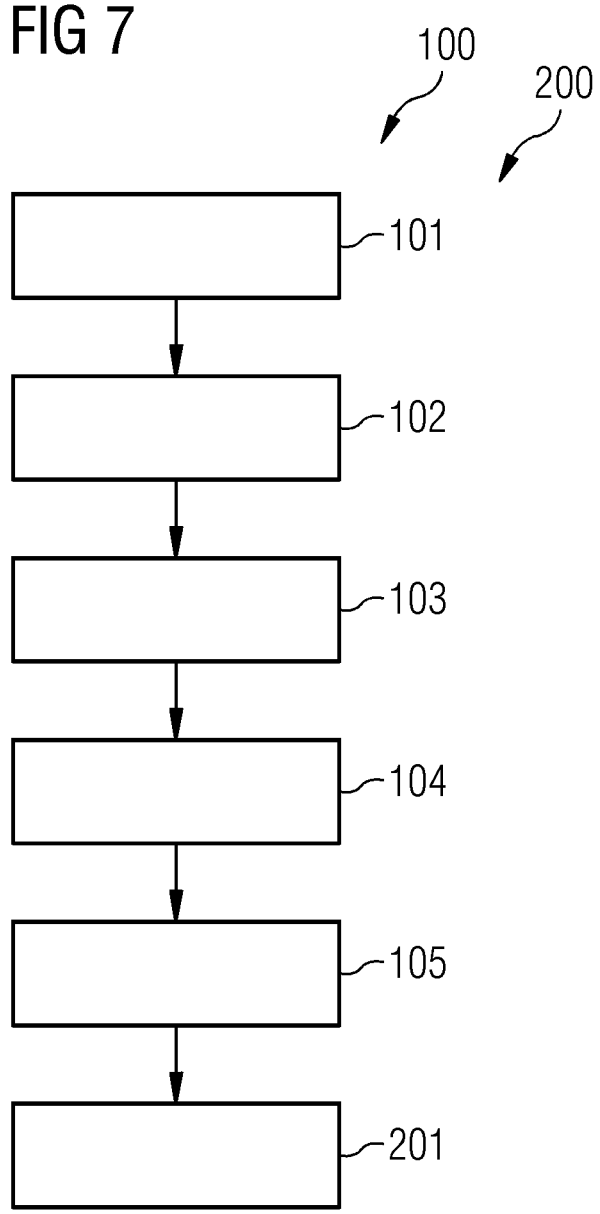

METHOD FOR COMMANDING AN UPSTREAM WIND TURBINE IN A WIND FARM

CROSS-REFERENCE TO RELATED APPLICATIONS

This application claims priority to PCT Application No. PCT/EP2022/059324, having a filing date of Apr. 7, 2022, which claims priority to EP Application No. 21382364.4, having a filing date of Apr. 21, 2021, the entire contents both of which are hereby incorporated by reference.

FIELD OF TECHNOLOGY

The following relates to a method, especially a computer-implemented method, for commanding an upstream wind turbine in a wind farm having a plurality of spatially distributed wind turbines, a method for controlling the upstream wind turbine in the wind farm, a system comprising means for carrying out any of these methods, a computer program associated with the computer-implemented method and a computer-readable medium associated with the computer program.

BACKGROUND

Since wind turbines generate electricity from energy contained in the wind, the wind behind the wind turbines has less energy content than the wind in front of the wind turbines. In other words, wind turbines always cast a wind shadow on the downstream side. This results in wakes behind the wind turbines, which are turbulent wind tails with a lower wind speed compared to the wind in front of the wind turbines. The wakes cause a lower power production efficiency of the wind turbines affected by it. As the flow of the wind proceeds downstream, there is a spreading of the wake, and the wake may recover towards free stream conditions.

The aggregated influence on the energy production of the wind farm, which results from the changes in wind speed caused by the impact of the wind turbines on each other, is often referred to as the so-called wake effect. It is important to consider wake effects from neighboring wind turbines within the same wind farm or due to nearby other wind farms.

In wind farms, individual wind turbines are distributed spatially with a certain distance from one another to reduce turbulence on the leeward side. Also, wind farms are typically spatially distributed with a certain distance from one another. However, wake effects still occur. There are two predominant techniques or, in other words, control operations for mitigating the effect of wakes on the annual energy production of a wind farm.

First, in order to reduce the wake effect in a wind farm, it is known to perform a so-called wake steering control operation by a wind turbine in front of the wind for a given wind direction. The wind turbines in front of the wind may also be referred to as the upstream wind turbines, whereas wind turbines downstream of the upstream wind turbine may be referred to as downstream wind turbines. In the wake steering control operation, the upstream wind turbine is angled towards the prevailing wind direction, or, in other words, a yaw misalignment of the upstream wind turbine is forced so as to steer the wake away from a downstream wind turbine. Thereby, the downstream wind turbine may become not or less effected by the wake, and its power production efficiency may be improved.

Second, it is known to perform induction control operations (sometimes also referred to as axial induction control operations) on the upstream wind turbine to reduce wake effects by weakening the wake effects (instead of steering the wake in another direction as done by the wake steering control operation). Such induction control operations are performed by manipulating the upstream wind turbine control actions. For example, the induction control operation may include pitch angle control of the wind turbine blades of the upstream wind turbine. The induction control operations aim at reducing the energy production efficiency at the upstream wind turbine(s) for the benefit of the downstream wind turbine(s).

Both the wake steering control operations and the induction control operations result in moving away from the design control settings for optimal performance of the wind turbines when operating them in an isolated manner because the design control settings do not consider the situation in a wind farm being different due to wake effects. Therefore, any form of wake manipulation involves a trade-off between reduced performance of the manipulated wind turbines and improved performance at other wind turbines such that the overall annual energy production of the wind farm is improved.

However, the inventors found that the overall yield or performance of a wind farm does not only depend on the overall annual energy production but also on other factors, such as wear and tear, which may be increased when using the above presented techniques for mitigating wake effects.

SUMMARY

Accordingly, an aspect relates to provide an improved method capable of increasing the overall performance of a wind farm.

According to a first aspect of embodiments of the invention, the aspect is solved by a method for commanding an upstream wind turbine in a wind farm having a plurality of spatially distributed wind turbines, the method comprising the steps of:

determining a wind direction of a wind impinging the upstream wind turbine located upstream of a downstream wind turbine located downstream of the upstream wind turbine in the wind farm such that the wind causes wake to impinge on the downstream wind turbine, determining a wake steering control command for the determined wind direction, the wake steering control command being capable of improving the power production efficiency of the wind farm, being executable by the upstream wind turbine and being configured to at least partially deflect the wake from the downstream wind turbine, determining a first load level of the downstream wind turbine for a case where the determined wake steering control command would be executed by the upstream wind turbine, determining a threshold of a load level based on a second load level of the downstream wind turbine (20) determined for a case where the determined wake steering control command is not forwarded to the upstream wind turbine (10) and on a predetermined tolerance value, and forwarding (or, in other words, sending) the determined wake steering control command to the upstream wind turbine for execution therewith if the first load level is less than the predetermined threshold of a load level.

Accordingly, embodiments of the invention provide for a method, especially a computer-implemented method, which does not only take into account an improved power production efficiency of the wind farm when a wake steering control command is executed on the upstream wind turbine but includes a further limitation or restriction before such wake steering control command is forwarded to the upstream wind turbine for execution therewith.

A finding of embodiments of the invention is that the improved power production efficiency is not the only variable to consider but there is another particularly relevant technical restriction to this case, namely the first load level experienced by the downstream wind turbine. It has been found that the load level of the downstream wind turbine may significantly increase due to the wake steering control commands. It has been found that partial wake situations in particular, i.e., the ones in which a center of the wake is around a lateral edge of the wind turbine blades, may be very harmful in terms of load level to the downstream wind turbine compared to a situation with no wake or full wake. Therefore, to increase the overall performance of the wind farm, such partial wake situations or more generally, situations with particularly high first load level on the downstream wind turbine, are avoided by the computer-implemented method of embodiments of the invention by means of the predetermined threshold of a load level.

A restriction to limit the harmful load levels in the downstream wind turbine is defined in the computer-implemented method by means of the predetermined threshold of a load level. The determined wake steering control command is only forwarded for execution with the upstream wind turbine if the first load level is less than the predetermined threshold of a load level. The threshold is predetermined such that first load levels of certain magnitude are being avoided. Consequently, in such situations, in particular partial wake situations, lower power production efficiency by not performing the wake steering control operation is accepted as trade-off for the lower load levels. In the short term, this leads to less annual energy production of the wind farm. However, in the long term, the reduced load experienced by the downstream wind turbines in the wind farm leads to less downtimes due to maintenance and reduced cost of maintenance, ultimately resulting in a greater annual energy production compared to when the wake steering control operation is performed regardless of the load levels at the downstream wind turbine.

The predetermined threshold of a load level may be adjusted and therefore the method according to the first aspect of embodiments of the invention provides great flexibility with respect to whether wake steering control commands are to be operated or not for the benefit of lower load levels on the downstream wind turbine.

Moreover, the threshold of a load level based on a second load level of the downstream wind turbine is determined for a case where the determined wake steering control command is not forwarded to the upstream wind turbine. Prior to determining the threshold of a load level, the second load level of the downstream wind turbine may be determined. The threshold for a load level may be set to be at least equal to the second load level. In particular, the threshold for a load level may be a sum of the second load level and a predetermined tolerance value which is deemed to be allowable considering the additional load applied to the downstream wind turbine as a consequence thereof.

Generally, when the wake steering control command is forwarded to the upstream wind turbine, the upstream wind turbine will perform a wake steering control operation corresponding to the wake steering control command. As explained in the introductory part of this description, generally, the wake steering control operation may be performed by the upstream wind turbine being angled towards the prevailing wind direction or, in other words, a yaw misalignment of the upstream wind turbine being forced so as to steer the wake away from a downstream wind turbine or, in other words, deflect the wake from the downstream wind turbine. The wake steering control command may contain all relevant information necessary for the execution of the corresponding operation, e.g., an angle of yaw misalignment of a yaw system of the upstream wind turbine.

The wake steering control operation will be typically performed such that the downstream wind turbine is not or less effected by the wake and its power production efficiency may be improved. However, a full deflection or steering away the wake from the downstream wind turbine may not always be possible or at least not beneficial in terms of the requirement that such wake steering control operation or, in other words, the wake steering control command, must be capable of improving the power production efficiency of the wind farm. This means that in the method according to the first aspect of embodiments of the invention, the determined wake steering control command will be forwarded to the upstream wind turbine if the command is capable of improving the power production efficiency of the wind farm and entirely steers away the wake from the downstream wind turbine because the first load level does not change by the wake steering control operation. A wake steering control command which is not capable of improving the power production efficiency of the wind farm will not be determined by the method. In a case where a wake steering control command is capable of improving the power production efficiency of the wind farm but full deflection of a wake from the downstream wind turbine is not possible, the wake steering control command will only be forwarded for execution with the upstream wind turbine if the load level requirement with respect to the threshold is met. Accordingly, the method achieves the improved performance of the wind farm by evaluating the harm of first load levels of the downstream wind turbine based on the predetermined threshold of a load level and, depending on the result of the evaluation, forwards the determined wake steering control command to the upstream wind turbine or not.

At least one or all of the steps of the computer-implemented method may be executed by one or multiple computers. Commanding or a (control) command as mentioned herein is generally understood as an action forwarded, transmitted, sent or communicated from a computer via a signal based on wireless or wired communication technology in order to cause a response, the response being the control operation mentioned herein.

The method according to the first aspect of embodiments of the invention may further comprise that the threshold of a load level is decreased, when the demand of electricity falls below a first demand level, and/or the threshold of a load level is increased, when the demand of electricity rises above a second demand level, wherein the second demand level is higher than the first demand level. Such threshold may be determined based on different conditions or parameters. For example, the threshold may be determined differently for different times of day and night. For example, the threshold may be decreased, when the demand of electricity is low, for example at nighttime, and the threshold may be increased, when the demand of electricity is high, for example at day time. Thereby, the wear of the downstream wind turbine may further be reduced.

When the first load level is greater than the predetermined threshold of a load level, the determined wake steering control command may or must not be forwarded. Accordingly, the wake steering control command is not executed when the threshold of a load level is exceeded by the first load level. This restriction prevents harmful loads on the upstream wind turbine.

The method may further include the step of determining an induction control command for the detected wind direction. The induction control command is capable of improving the power production efficiency of the wind farm. The induction control command is further executable by the upstream wind turbine. And the induction control command is configured to weaken the wakes at the downstream turbine when it is executed by the upstream wind turbine. Such induction control command may be forwarded to the upstream wind turbine for execution therewith as induction control operation. As explained above, the induction control operations on the upstream wind turbine resulting from executing the induction control command forwarded thereto may be configured to reduce wake effects by weakening the wake effects (instead of steering the wake in another direction as done by the wake steering control operation). Such induction control operations may be performed by manipulating the upstream wind turbine control actions. For example, the induction control operation may include pitch angle control of the wind turbine blades of the upstream wind turbine, in particular varying the pitch angle of the wind turbine blades. In any case, the induction control operations may aim at reducing the energy production efficiency at the upstream wind turbine for the benefit of the downstream wind turbine(s).

The induction control command may be forwarded to the upstream wind turbine if the first load level is greater than the predetermined threshold of a load level. Thereby, even when the determined wake steering control command is not forwarded to the upstream wind turbine or, in other words, wake steering control operations are forbidden, the power production efficiency of the wind farm may still be increased by means of induction control operations if this has the benefit of improving the overall power production efficiency of the wind farm.

The first load level may be a fatigue load level of a yaw system of the downstream wind turbine. Such fatigue load level may be determinable by measuring the torque at the yaw system. It has been found that the partial wake situations are particularly harmful with respect to the fatigue load level experienced at the yaw system of the downstream wind turbine and may be prevented by the proposed method according to the first aspect of embodiments of the invention in order to increase the overall performance of the wind farm in the long term.

The threshold of a load level may be predetermined such that no partial wake impinges on the downstream wind turbine. In particular, the threshold may be substantially equal to the second load level. Thereby, any harmful first load levels may be prevented, thereby benefiting the long-term operations and production efficiency of the wind farm.

Whether a detected wind direction of a wind impinging the upstream wind turbine causes wake to impinge on the downstream wind turbine may be predetermined by a simulation. The detection of the wind direction may be performed by an anemometer installed in the wind farm, in particular on any one or all of the wind turbines of the wind farm, at least the upstream wind turbine. Also, or, alternatively, the wake steering control command for the detected wind direction may be predetermined by a simulation. Also, or alternatively, the first load level of the downstream wind turbine may be predetermined by a simulation. The simulation in every one of these cases has the benefit that no complex live measurement and/or calculation needs to be performed. Instead, the predetermined data from the simulations may be stored in a respective (storage) medium. Then, the computer simply needs to read the respective simulation data from the medium for the determination in the respective step of the method according to the first aspect of embodiments of the invention, i.e., determining the wind direction, the wake steering control command and/or the first load level.

The simulation may be an upfront simulation. This means that the simulation is not live but done prior to performing the steps of the method according to the first aspect of embodiments of the invention. This has the advantage that the method can be performed in a timely manner every time the wind direction substantially shifts. Accordingly, a once performed simulation for a wind farm may be used for the wind farm every time the method according to the first aspect of embodiments of the invention is performed.

The steps of the method may be repeated for different wind directions of a wind impinging the upstream wind turbine. This has the advantage that the wear and tear of the upstream wind turbine decreases as well because less wake steering control commands will be performed and thereby less yaw misalignments need to be performed.

It may be provided that at least two wake steering control commands for the detected wind direction capable of improving the power production efficiency of the wind farm are determined, a first load level of the downstream wind turbine for each of the at least two determined wake steering control commands is determined, and among the at least two determined wake steering control commands, the one determined wake steering control to the upstream wind turbine which has a determined first load level that is less than the predetermined threshold of a load level and the greatest capability of improving the power production efficiency of the wind farm is forwarded. This relates to a case where there are multiple possibilities or wake steering control commands capable of improving the power production efficiency of the wind farm. By this measure, always the one of the multiple wake steering control commands will be chosen for execution, which on the one hand meets the requirement with respect to the predetermined threshold of a load level and on the other hand delivers the best power production efficiency of the wind farm.

Only for the purpose of conciseness, the method has been presented in its simplest application of having only one single upstream wind turbine influencing only one single downstream wind turbine. However, of course, the method according to the first aspect of embodiments of the invention may be performed on multiple wind turbines in a wind farm. That is, there may be multiple upstream wind turbines for which the method according to the first aspect of embodiments of the invention may be executed simultaneously or consecutively. Also, there may be multiple downstream wind turbines located downstream of the one or multiple upstream wind turbines. Accordingly, the method may be designed such that the method determines multiple first load levels, each first load level being one of a downstream wind turbine of multiple downstream wind turbines. The forwarding of the determined wake steering control command to the upstream wind turbine for execution therewith may accordingly be done if all first load levels are less than a common predetermined threshold of a load level or less than individual predetermined thresholds of load levels for every single one of the multiple downstream wind turbines, for example. The wind direction may be turning and thus, the designation of the upstream wind turbine and the downstream wind turbine may change depending on the wind direction.

According to a second aspect of embodiments of the invention, the initially stated aspect is solved by a method for controlling an upstream wind turbine in a wind farm having a plurality of spatially distributed wind turbines. This further method comprises the steps of the method according to the first aspect of embodiments of the invention or the method according to the first aspect of embodiments of the invention itself. It further comprises the step of executing the determined wake steering control command by the upstream wind turbine upon receiving the wake steering control command forwarded thereto.

Accordingly, as previously explained, the forwarded determined wake steering control command is received by the upstream wind turbine and consequently, it may be executed by a control unit, in particular of a yaw system, for example.

The system may in particular be a controller. The controller may be a controller of the wind farm or a controller of a wind turbine, in particular the upstream wind turbine.

The system may comprise a computer or computing unit, a computer-readable (storage) medium and a command device and/or communication device.

According to a fourth aspect of embodiments of the invention, the initially stated aspect is solved by a computer program product (non-transitory computer readable storage medium having instructions, which when executed by a processor, perform actions) comprising instructions which, when the computer program is executed by a computer, cause the computer to carry out the method according to the first aspect of embodiments of the invention.

According to a fifth aspect of embodiments of the invention, the initially stated aspect is solved by a computer-readable (storage) medium comprising instructions which, when executed by a computer, cause the computer to carry out the method according to the first aspect of embodiments of the invention.

BRIEF DESCRIPTION

Some of the embodiments will be described in detail, with reference to the following figures, wherein like designations denote like members, wherein:

FIG. 7 shows a schematic illustration of a method for controlling the upstream wind turbine in the wind farm of FIG. 2.

DETAILED DESCRIPTION

Same aspects in FIGS. 1 to 7 are denominated with the same reference number. The specific dimensions of features and parts in the figures are exemplary and may be enlarged for ease of reference only.

Figure 1:
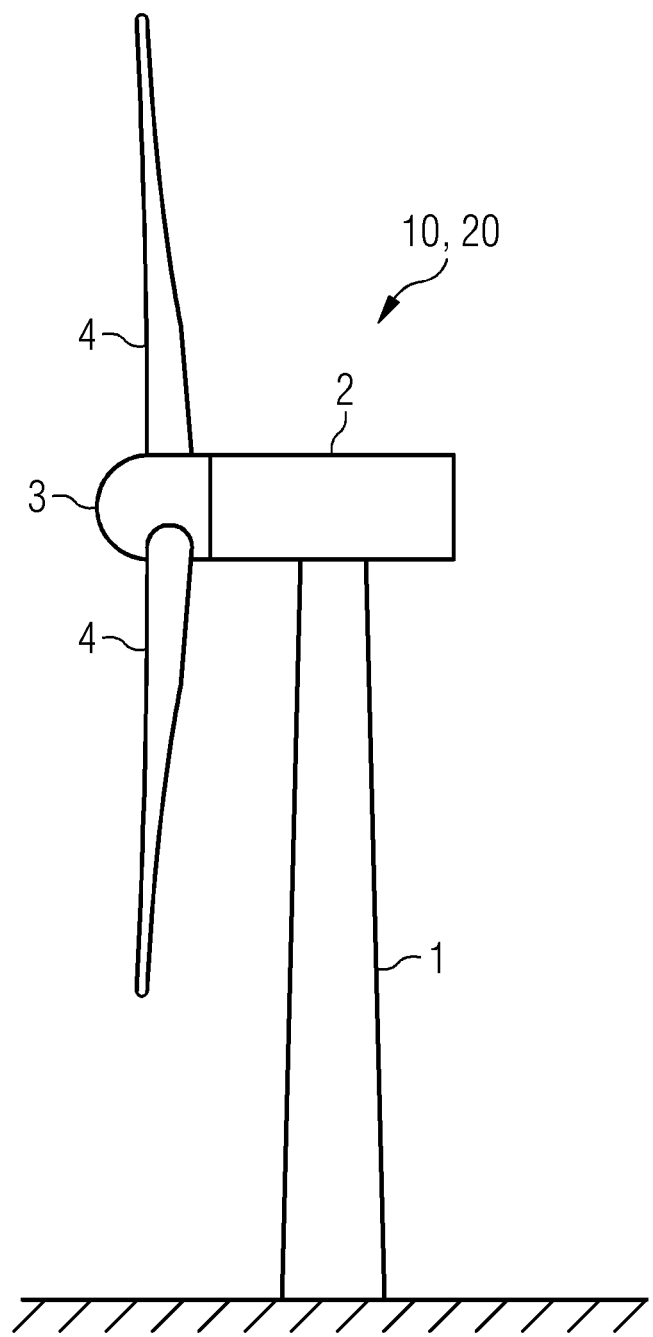
FIG. 1 shows a side view on a wind turbine for use in a wind farm.

FIG. 1 shows a wind turbine 10, 20. The wind turbine 10, 20 comprises a supporting tower 1 and a nacelle 2, whereby the nacelle 2 is attached to the supporting tower 1. The wind turbine 10, 20 further comprises a rotor 3 and a number of wind turbine blades 4 attached thereto. The wind turbine 10, 20 also comprises a yaw system (not shown) for yawing the nacelle 2 relative to the supporting tower 1. By means of the yawing of the nacelle 2, the rotor 3 and wind turbine blades 4 may be positioned for best performance given the wind directions of a current wind. Also, the wind turbine 10, 20 may comprise an anemometer (not shown) for measuring the wind direction of the wind.

Figure 2:
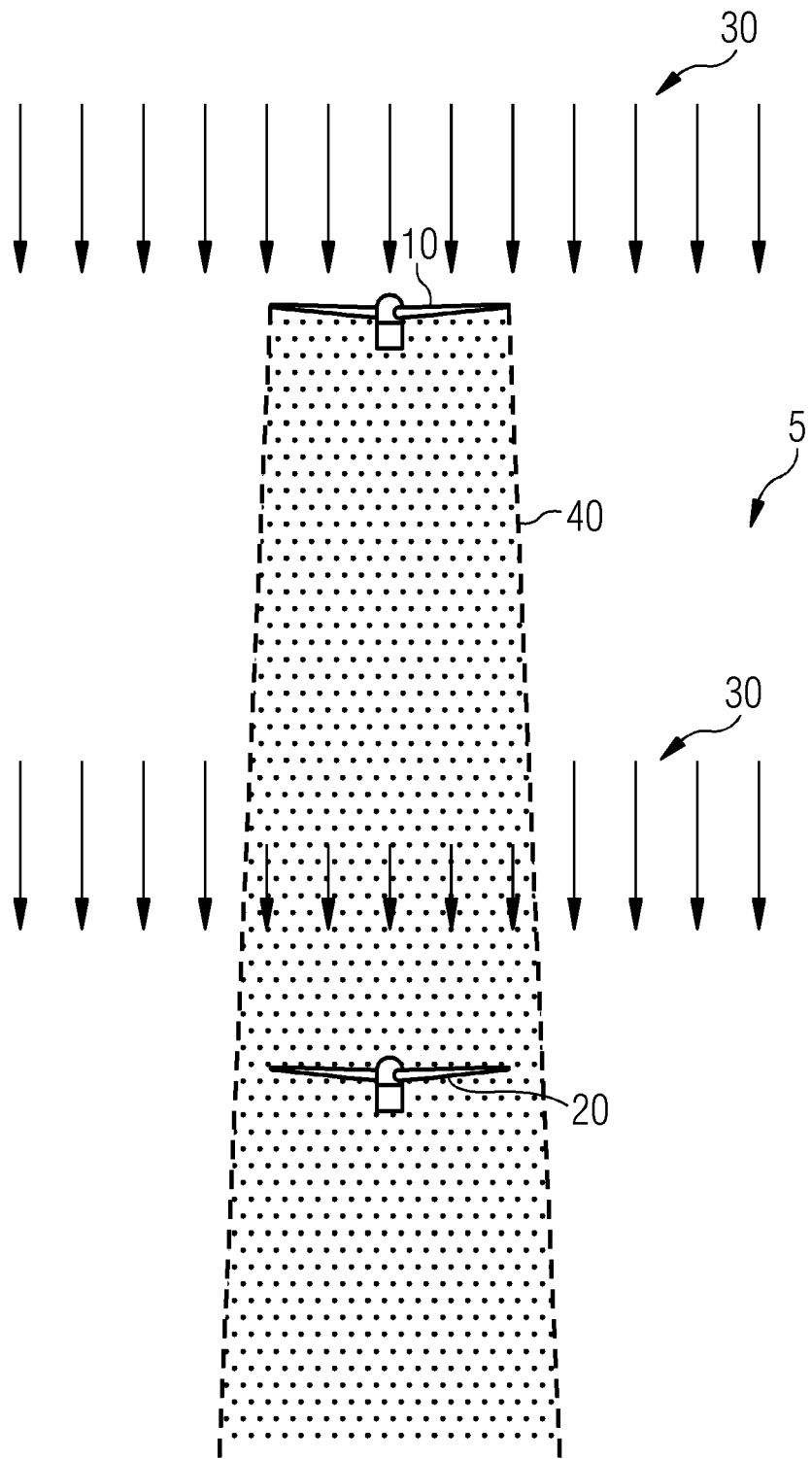
FIG. 2 shows a schematic illustration of a wind farm with two wind turbines, a downstream wind turbine experiencing wake from an upstream wind turbine.

FIG. 2 shows a schematic illustration of a wind farm 5 with two wind turbines 10, 20. Although the wind farm 5 of this example is only shown with two wind turbines 10, 20, the number of wind turbines 10, 20 of the wind farm 5 may also be much higher, e.g. at least 5, 10, 20 or more.

Given the wind 30 indicated with its direction by the arrows illustrating the wind 30, the wind turbine 10 is located upstream of the wind turbine 20. Accordingly, the wind turbine 10 may also be referred to as the upstream wind turbine 10 as it is in front of the wind 30. The wind turbine 20, on the other hand, may be referred to as a downstream wind turbine 20 because it is located behind the upstream wind turbine 10 given the current wind direction of the wind 30 represented by the arrows. This designation of upstream and downstream of the wind turbines 10, 20 may change with a shift of direction of the wind 30. In particular, other wind turbines not shown in FIG. 2 may then become upstream and/or downstream located wind turbines 10, 20.

As explained in the introductory part of this description, the upstream wind turbine 10 generates electricity based on the energy of the wind 30 impinging on the upstream wind turbine 10 and causes a wake 40 impinging on the downstream wind turbine 20. In the situation shown in FIG. 2, the downstream wind turbine 20 is fully affected by the wake 40. The wake 40 results in a significantly decreased energy production of the downstream wind turbine 20 compared to the upstream wind turbine 10.

Figure 3:
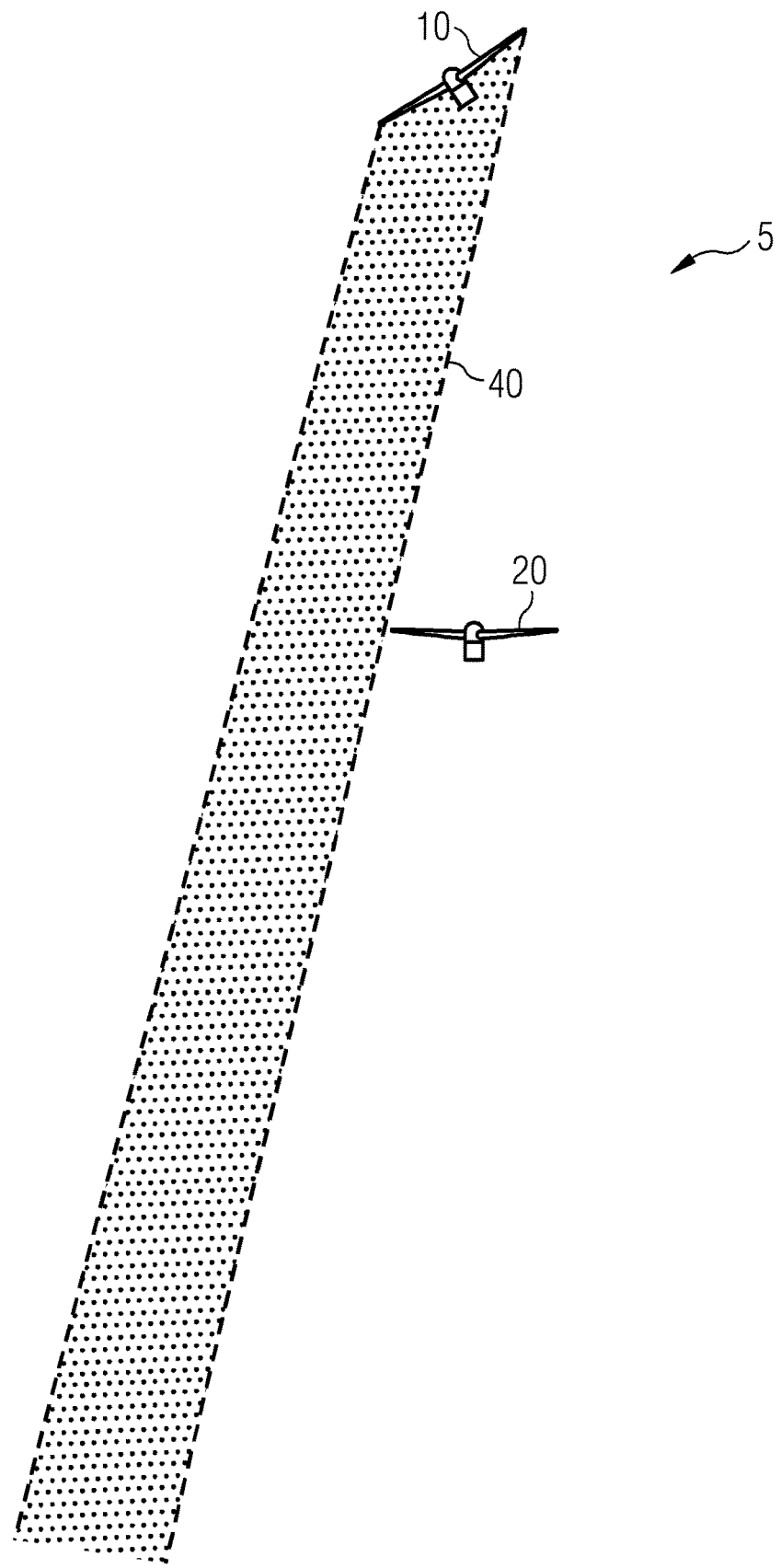
FIG. 3 shows a further schematic illustration of the wind farm, of FIG. 2, the wake being fully deflected from the downstream wind turbine.

FIG. 3 shows the same wind farm 5 but with a wake steering control operation executed by the upstream wind turbine 10. In the situation shown in FIG. 3, the yaw system of the upstream wind turbine 10 is misaligned with respect to an optimal positioning into the wind 30 such that the wake 40 may be entirely deflected from the downstream wind turbine 20. However, this may not always be possible or despite increased energy production of the downstream wind turbine 20 result in an overall decreased annual energy production of the wind farm 5.

Figure 4:
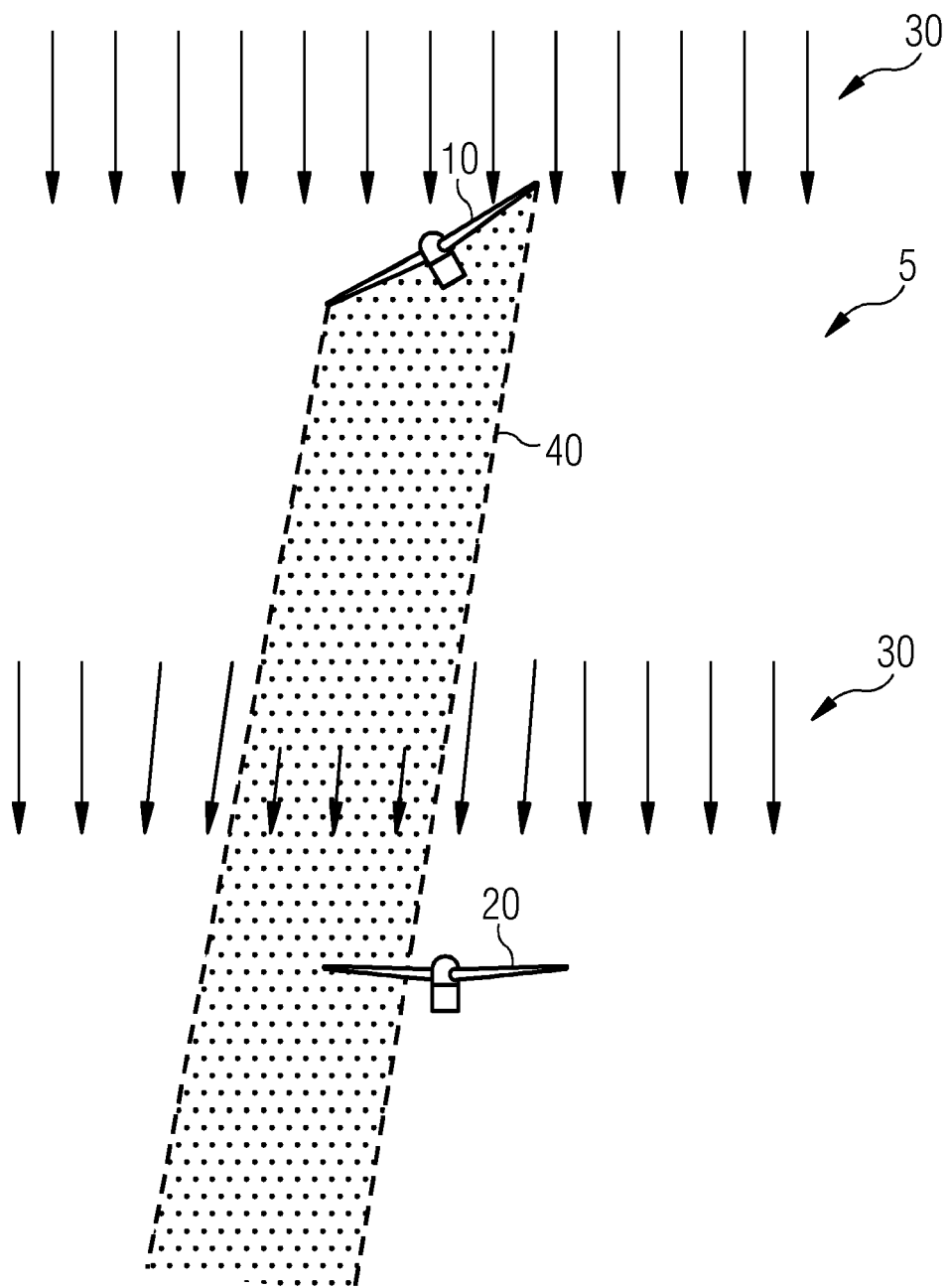
FIG. 4 shows a further schematic illustration of the wind farm of FIG. 2, the wake being partially deflected from the downstream wind turbine.

A further possibility of a situation in which the upstream wind turbine 10 executes a wake steering control operation is shown in FIG. 4. In FIG. 4, the wake steering control operation leads to a partial wake situation of the downstream wind turbine 20. The wake 40 is not entirely deflected from the downstream wind turbine 20 but the wake 40 is seen to be around the lateral edge of the wind turbine blades 4 of the downstream wind turbine 20.

Figure 5:
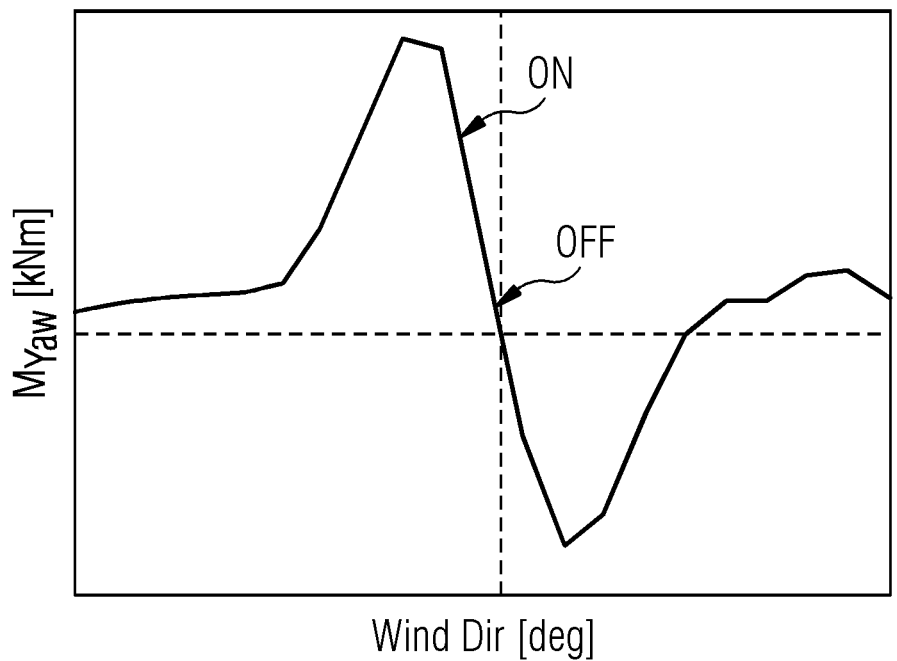
FIG. 5 shows a diagram indicating the load level at the downstream wind turbine depending on the wind direction.

FIG. 5 illustrates the harmful effect in terms of load level experienced by the downstream wind turbine 20 depending on the wind direction Wind Dir in degrees, in particular fatigue load level measured as torque $M_{Yaw}$ in kNm on the yaw system of the downstream wind turbine 20.

The dotted line of the torque $M_{Yaw}$ and the wind direction Wind Dir represent the baseline operation. Baseline operation means that there is no wake, and the wind direction is substantially perpendicular to the wind turbine blades 4. The torque is substantially zero in such operation.

OFF designates a point of operation of the downstream wind turbine 20 at full wake 40 as may be seen in FIG. 2. At full wake 40, there is only little torque.

ON designates a point of operation of the downstream wind turbine 20 at partial wake 40 as may be seen in FIG. 4. At partial wake 40, the torque and thereby the fatigue load level of the yaw system of the downstream wind turbine 20 are significantly increased.

Accordingly, shifting towards other wind directions than perpendicular to the wind turbine blades 4, i.e., such that the wind 30 due to the wake 40 partially impinges the lateral edges of the wind turbine blades 4 of the downstream wind turbine 20, as indicated by the arrows within the wake 40 in FIG. 4, results in a significant rise of torque and thereby fatigue load level as may be seen from FIG. 5.

Accordingly, the wake steering control operation performed by the upstream wind turbine 10 in the situation shown in FIG. 4 results in an optimized annual energy production of the wind farm 5 but the overall performance of the wind farm 5 may be decreased due to the significantly increased load level imposed on the downstream wind turbine 20, which may lead to downtimes and significant service costs of the downstream wind turbine 20 in the long term.

Figure 6:
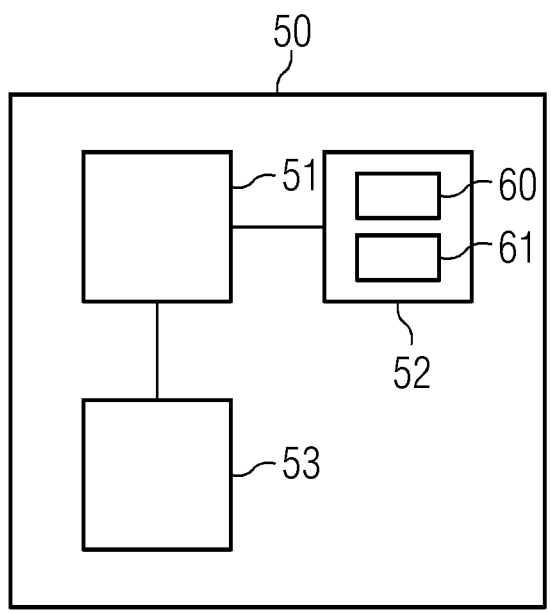
FIG. 6 shows a system for carrying out a method for commanding the upstream wind turbine in the wind farm of FIG. 2.

FIG. 6 shows a system 50 for commanding the upstream wind turbine 10 in the wind farm 5 as previously described.

The system 50 may be a controller of the wind farm 5. The controller may be located at a distance from the wind turbines 10, 20 within the wind farm 5 or away from the wind farm 5. However, the controller may be physically or wirelessly connected to the wind turbines 10, 20 of the wind farm 5. Alternatively, the controller may be located within one or all of the wind turbines 10, 20.

The system 50 comprises a computer 51, which may also be referred to as a computing unit, a computer-readable (storage) medium 52 and a command device 53 or communication device for forwarding commands to the wind turbines 10, 20 of the wind farm 5, in particular to control units (not shown) within the wind turbines 10, 20. The command device 53 or communication device may be configured for wired or wireless communication. Control units of the wind turbines 10, 20 may be part of the system 50 when the system 50 is located within the wind turbines 10, 20.

The computer-readable medium 52 comprises a computer program 60 comprising instructions which, when the computer program 60 is executed by the computer 51, cause the computer 51 to carry out the method 100 shown schematically in FIG. 7. The computer-readable medium 52 further comprises simulation data 61 stored thereon.

FIG. 7 schematically illustrates a method 200 for controlling the upstream wind turbine 10 in the wind farm 5 having the plurality of spatially distributed wind turbines 10, 20. The method 200 comprises a computer-implemented method 100 executed on the computer 51 of the system 50 of the wind farm 5.

The method 100 has a first method step 101 of determining a wind direction of the wind 30 impinging the upstream wind turbine 10 such that the wind 30 causes wake 40 to impinge on the downstream wind turbine 20 as may be seen in FIG. 4. The first step 101 requires knowledge of the wind direction of the wind 30. Accordingly, for this first step 101 of determination, a wind direction of the wind 30 may be measured. This step may be carried out with assistance of the computer 51 or separate from the computer 51 in an anemometer (not shown) at the upstream wind turbine 10, for example, and forwarded from the anemometer to the upstream wind turbine 10. Once the wind direction 30 has been detected, it will be determined by the computer 51 whether that wind direction is a wind direction which will cause wake 40 to impinge on the downstream wind turbine 20 or not. For this purpose, the computer 51 may access the simulation data 61 stored in the computer-readable medium 52. The simulation data 61 may contain, for different wind directions of wind 30, whether or not the wind turbine 20 is located downstream and the wind 30 will cause wake 40 to impinge on the downstream wind turbine 20. This simulation may have been based on the position of the wind turbines 10, 20, terrestrial data and so on. The simulation data 61 may for instance be a look-up table based on an upfront simulation.

The method 100 then proceeds with the second step 102, which is a determination of a wake steering control command for the wind direction determined in step 101. The wake steering control command is determined such that it is capable of improving the power production efficiency of the wind farm 5. The wake steering control command is configured such that it is executable by the upstream wind turbine 10 or, more particularly, a control unit of a yaw system of the upstream wind turbine 10. The wake steering control command is further configured such that it at least partially deflects the wake 40 from the downstream wind turbine 20. For the second step 102, the computer 51 may access the simulation data 61 as well, the simulation data 61 containing wake steering control commands for different wind directions at which wake 40 will impinge on the downstream wind turbine 20 at the detected or measured wind direction.

In a third step 103, a first load level of the downstream wind turbine 20 is determined for the case that the wake steering control command determined in step 102 would be executed by the upstream wind turbine 10. For the third step 103, the computer 51 may access the simulation data 61 as well, the simulation data 61 containing the first load levels for the different determined wind directions.

In a fourth step 104, a threshold of a load level based on a second load level of the downstream wind turbine 20 is determined. The second load level is the load level experienced by the downstream wind turbine 20 when the determined wake steering control command is not executed by the upstream wind turbine 10. The threshold may also be gathered from the simulation data 61 by the computer 51.

Finally, in the fifth step 105 of the method 100, the determined wake steering command is forwarded to the upstream wind turbine 10 for execution therewith if the first load level is less than the predetermined threshold of a load level.

In this case, the method step 201 of method 200 comprising the method 100 will be performed by the control unit of the yaw system of the upstream wind turbine 10 receiving the forwarded determined wake steering control command.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for commanding an upstream wind turbine in a wind farm having a plurality of spatially distributed wind turbines, the method comprising the steps of:
   determining a wind direction of a wind impinging the upstream wind turbine located upstream of a downstream wind turbine located downstream of the upstream wind turbine in the wind farm such that the wind causes wake to impinge on the downstream wind turbine;
   determining a wake steering control command for the determined wind direction, the wake steering control command being capable of improving a power production efficiency of the wind farm, being executable by the upstream wind turbine and being configured to at least partially deflect the wake from the downstream wind turbine;
   determining a first load level of the downstream wind turbine for a case where the determined wake steering control command would be executed by the upstream wind turbine,
   determining a threshold of a load level based on a second load level of the downstream wind turbine determined for a case where the determined wake steering control command is not forwarded to the upstream wind turbine and on a predetermined tolerance value;
   forwarding the determined wake steering control command to the upstream wind turbine for execution therewith if the first load level is less than the determined threshold of a load level; and
   executing the determined wake steering control command by the upstream wind turbine upon receiving the wake steering control command forwarded thereto.

2. The method according to claim 1, whereby the determined threshold of a load level is decreased, when a demand of electricity falls below a first demand level, and/or the determined threshold of a load level is increased, when the demand of electricity rises above a second demand level, wherein the second demand level is higher than the first demand level.

3. The method according to claim 1, whereby when the first load level is greater than the determined threshold of a load level, the determined wake steering control command is not being forwarded.

4. The method according to claim 1, whereby the method further includes the step of determining an induction control command for the detected wind direction, the induction control command being capable of improving the power production efficiency of the wind farm, being executable by the upstream wind turbine and being configured to weaken the wakes at the downstream turbine.

5. The method according to claim 4, whereby the induction control command is forwarded to the upstream wind turbine if the first load level is greater than the determined threshold of a load level.

6. The method according to claim 1, whereby the first load level is a fatigue load level of a yaw system of the downstream wind turbine.

7. The method according to claim 1, whereby the threshold of a load level is determined such that no partial wake impinges on the downstream wind turbine.

8. The method according to claim 1, whereby whether a detected wind direction of a wind impinging the upstream wind turbine causes wake to impinge on the downstream wind turbine, the wake steering control command for the detected wind direction, and/or the first load level of the downstream wind turbine is predetermined by a simulation.

9. The method according to claim 8, whereby the simulation is an upfront simulation.

10. The method according to claim 1, whereby the steps of the method are repeated for different wind directions of a wind impinging the upstream wind turbine.

11. The method according to claim 1, whereby at least two wake steering control commands for the detected wind direction capable of improving the power production efficiency of the wind farm are determined, the first load level of the downstream wind turbine for each of the at least two determined wake steering control commands is determined, and among the at least two determined wake steering control commands forwarding the one determined wake steering control command to the upstream wind turbine which has a determined first load level that is less than the determined threshold of a load level and the greatest capability of improving the power production efficiency of the wind farm.

12. A system for carrying out the method of claim 1.

13. A computer program product, comprising a computer readable hardware storage device having computer readable program code stored therein, said program code executable by a processor of a computer system to implement a method comprising instructions which, when the computer program is executed by a computer, cause the computer to carry out the method of claim 1.

14. A computer-readable medium comprising instructions which, when executed by a computer, cause the computer to carry out the method of claim 1.

* * * * *